(12) United States Patent
Ohashi (10) Patent No.: US 11,100,716 B2
(45) Date of Patent: Aug. 24, 2021

(54) IMAGE GENERATING APPARATUS AND IMAGE GENERATION METHOD FOR AUGMENTED REALITY

(71) Applicant: Sony Interactive Entertainment Inc., Tokyo (JP)

(72) Inventor: Yoshinori Ohashi, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/652,101

(22) PCT Filed: Oct. 5, 2018

(86) PCT No.: PCT/JP2018/037367
§ 371 (c)(1),
(2) Date: Mar. 30, 2020

(87) PCT Pub. No.: WO2019/073925
PCT Pub. Date: Apr. 18, 2019

(65) Prior Publication Data
US 2020/0312032 A1   Oct. 1, 2020

(30) Foreign Application Priority Data
Oct. 13, 2017   (JP) .............................. JP2017-199784

(51) Int. Cl.
*G06T 19/00*   (2011.01)
*G06T 15/20*   (2011.01)

(52) U.S. Cl.
CPC ............ *G06T 19/006* (2013.01); *G06T 15/20* (2013.01)

(58) Field of Classification Search
CPC .............................. G06T 15/20; G06T 19/006

USPC ......................................................... 345/633
See application file for complete search history.

(56) References Cited

U.S. PATENT DOCUMENTS

| 9,514,571 | B2 * | 12/2016 | Williams | ................. | G06K 9/66 |
| 9,747,726 | B2 * | 8/2017 | Williams | ............. | G06K 9/6215 |
| 2015/0002542 | A1 * | 1/2015 | Chan | .................... | G09G 3/3225 |
| | | | | | 345/633 |
| 2016/0364904 | A1 | 12/2016 | Parker | | |
| 2018/0275748 | A1 * | 9/2018 | Haraden | ................ | G06T 15/503 |
| 2018/0276824 | A1 * | 9/2018 | Haraden | ................ | G09G 3/007 |

OTHER PUBLICATIONS

International Preliminary Report on Patentability and Written Opinion for corresponding PCT Application No. PCT/JP2018/037367, 13 pages, dated Apr. 23, 2020.
International Search Report for corresponding PCT Application No. PCT/JP2018/037367, 2 pages, dated Dec. 11, 2018.

* cited by examiner

*Primary Examiner* — Jacinta M Crawford
(74) *Attorney, Agent, or Firm* — Matthew B. Dernier, Esq.

(57) ABSTRACT

A rendering unit renders an object in a virtual space to generate a computer graphics image. An AR superimposing unit superimposes the computer graphics image on a captured image of a reality space to generate an augmented-reality image. A post-processing unit performs post-processing on the augmented-reality image. The AR superimposing unit superimposes, on the same computer graphics image, a plurality of captured images provided at a frame rate higher than the frame rate of the computer graphics image generated by the rendering unit, to generate the augmented-reality image.

6 Claims, 7 Drawing Sheets

IMAGE GENERATING APPARATUS AND IMAGE GENERATION METHOD FOR AUGMENTED REALITY

TECHNICAL FIELD

The present invention relates to an apparatus and a method that are used to generate images.

BACKGROUND ART

There are situations where players of a game wear head-mount displays connected to games consoles on their heads, and play the game by manipulating controllers and the like while watching screens displayed on the head-mount displays. Since if users wear a head-mount display, they see nothing other than a video being displayed on the head-mount display, this has the effect of enhancing the sense of immersion into the world of the video, and making the game more entertaining. In addition, when a video of VR (Virtual Reality) is being displayed on a head-mount display, if a user wearing the head-mount display can view a virtual space in all directions around him/her 360-degrees by turning his/her head, the sense of immersion into the video is enhanced further, and the manipulability of an application such as a game is also improved.

In addition, although it becomes impossible for a user wearing a non-transparent head-mount display to see the outside world directly, there are video-transparent (video see-through) head-mount displays that can capture a video of the outside world by a camera mounted on the head-mount displays, and display the video on their display panels. Video-transparent head-mount displays also superimpose objects in a virtual world generated by CG (Computer Graphics) on a video of the outside world captured by a camera, and thereby can generate and display a video of AR (Augmented Reality). Such an augmented-reality video represents the real world which is augmented by virtual objects unlike virtual reality disconnected from the real world, and users can experience a virtual world while being aware of a connection with the real world.

SUMMARY

Technical Problems

In a case where augmented-reality videos are displayed on a head-mount display, videos of the outside world are taken in by a camera mounted on the head-mount display at a high frame rate in conjunction with motions of the user's head. On the other hand, a virtual world on which those videos are superimposed requires a long time for rendering, so that the frame rate of the virtual world is lower than that of the camera. Accordingly, augmented-reality videos cannot be generated in accordance with the high frame rate of the camera, and a user feels slight delays in augmented-reality videos, resulting in the loss of the sense of connection with the real world. In addition, since the frequency of post-processing performed on augmented-reality videos is also the same as the frequency of rendering, the quality of videos lowers.

The present invention has been made in view of such problems, and an object thereof is to provide an image generating apparatus and an image generation method that can improve the visual quality of computer graphics.

Solution to Problems

In order to solve the problems, an image generating apparatus in an aspect of the present invention includes: a rendering unit that renders an object in a virtual space to generate a computer graphics image; and a post-processing unit that performs post-processing on the computer graphics image. The post-processing unit performs the post-processing on the computer graphics image at a frequency higher than a frame rate at which the rendering unit generates the computer graphics image.

Another aspect of the present invention is also an image generating apparatus. The apparatus includes: a rendering unit that renders an object in a virtual space to generate a computer graphics image; a superimposing unit that superimposes the computer graphics image on a captured image of a reality space to generate an augmented-reality image; and a post-processing unit that performs post-processing on the augmented-reality image. The superimposing unit superimposes, on the same computer graphics image, a plurality of the captured images provided at a frame rate higher than a frame rate of the computer graphics image generated by the rendering unit, to generate the augmented-reality image.

Still another aspect of the present invention is an image generation method. The method includes: a rendering step of rendering an object in a virtual space to generate a computer graphics image; a superimposing step of superimposing the computer graphics image on a captured image of a reality space to generate an augmented-reality image; and a post-processing step of performing post-processing on the augmented-reality image. In the superimposing step, a plurality of the captured images provided at a frame rate higher than a frame rate of the computer graphics image generated by the rendering unit are superimposed on the same computer graphics image to generate the augmented-reality image.

Note that any combination of constituent elements explained above, and configurations obtained by converting expressions of the present invention between methods, apparatuses, systems, computer programs, data structures, recoding mediums and the like are also valid as aspects of the present invention.

Advantageous Effect of Invention

According to the present invention, the visual quality of computer graphics can be improved.

DESCRIPTION OF EMBODIMENT

Figure 1:
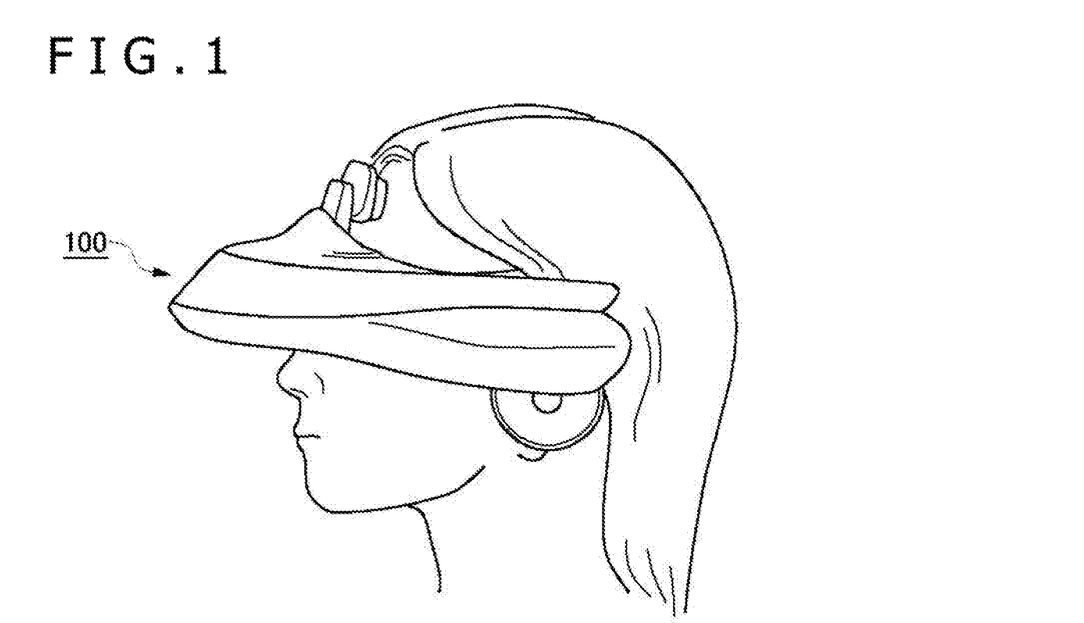
FIG. 1 is an external-appearance view of a head-mount display.

FIG. 1 is an external-appearance view of a head-mount display 100. The head-mount display 100 is a display apparatus worn on a user's head in order for the user to watch still images, moving images or the like displayed on the display, and listen to sounds, music or the like output from a headphone.

A gyro sensor, an acceleration sensor or the like built in or externally attached to the head-mount display 100 enables measurement of information regarding the position of the user's head wearing the head-mount display 100, and information regarding the orientation of the head such as the rotation angle or the inclination.

The head-mount display 100 has a camera unit mounted thereon which can capture images of the outside world while a user is wearing the head-mount display 100.

The head-mount display 100 is one example of a "wearable display." Although a method of generating images to be displayed on the head-mount display 100 is explained here, an image generation method of the present embodiment can be applied not only to cases where the head-mount display 100 in its narrow sense is worn, but also to cases where eyeglasses, an eye-glass type display, an eye-glass type camera, a headphone, a headset (a headphone with a microphone), earphones, earrings, an ear-wearable camera, a hat, a camera-mounted hat, a hairband or the like is worn.

Figure 2:
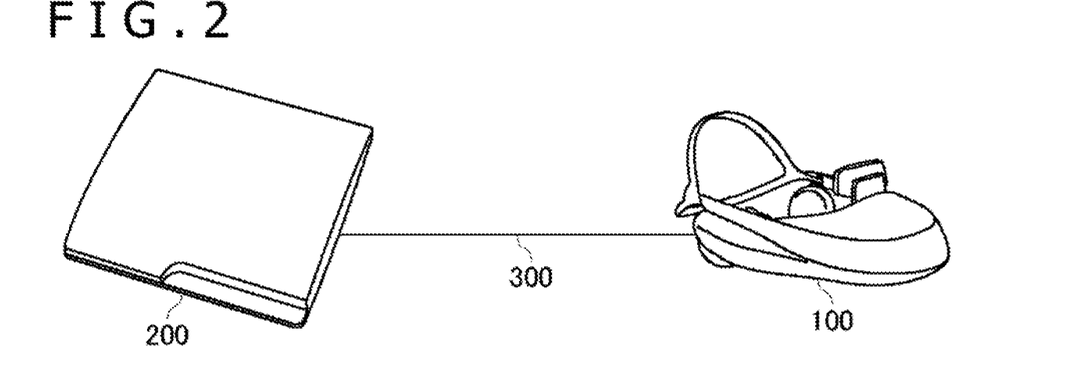
FIG. 2 is a configuration view of an image generating system according to the present embodiment.

FIG. 2 is a configuration view of an image generating system according to the present embodiment. The head-mount display 100 is connected to an image generating apparatus 200 through an interface 300 complying with HDMI (registered trademark) (High-Definition Multimedia Interface) which is a standard of communication interfaces for transmitting videos and sounds with digital signals or complying with any other standard, for example.

The image generating apparatus 200 predicts position and orientation information regarding the head-mount display 100 taking into consideration a delay from generation to display of a video based on current position and orientation information regarding the head-mount display 100, draws an image that should be displayed on the head-mount display 100 on the premise of the predicted position and orientation information regarding the head-mount display 100, and transmits the image to the head-mount display 100.

One example of the image generating apparatus 200 is a games console. The image generating apparatus 200 may further be connected to a server via a network. In that case, the server may provide, to the image generating apparatus 200, an online application such as a game in which a plurality of users can participate via networks. The head-mount display 100 may be connected to a computer or a mobile terminal instead of the image generating apparatus 200.

Figure 3:
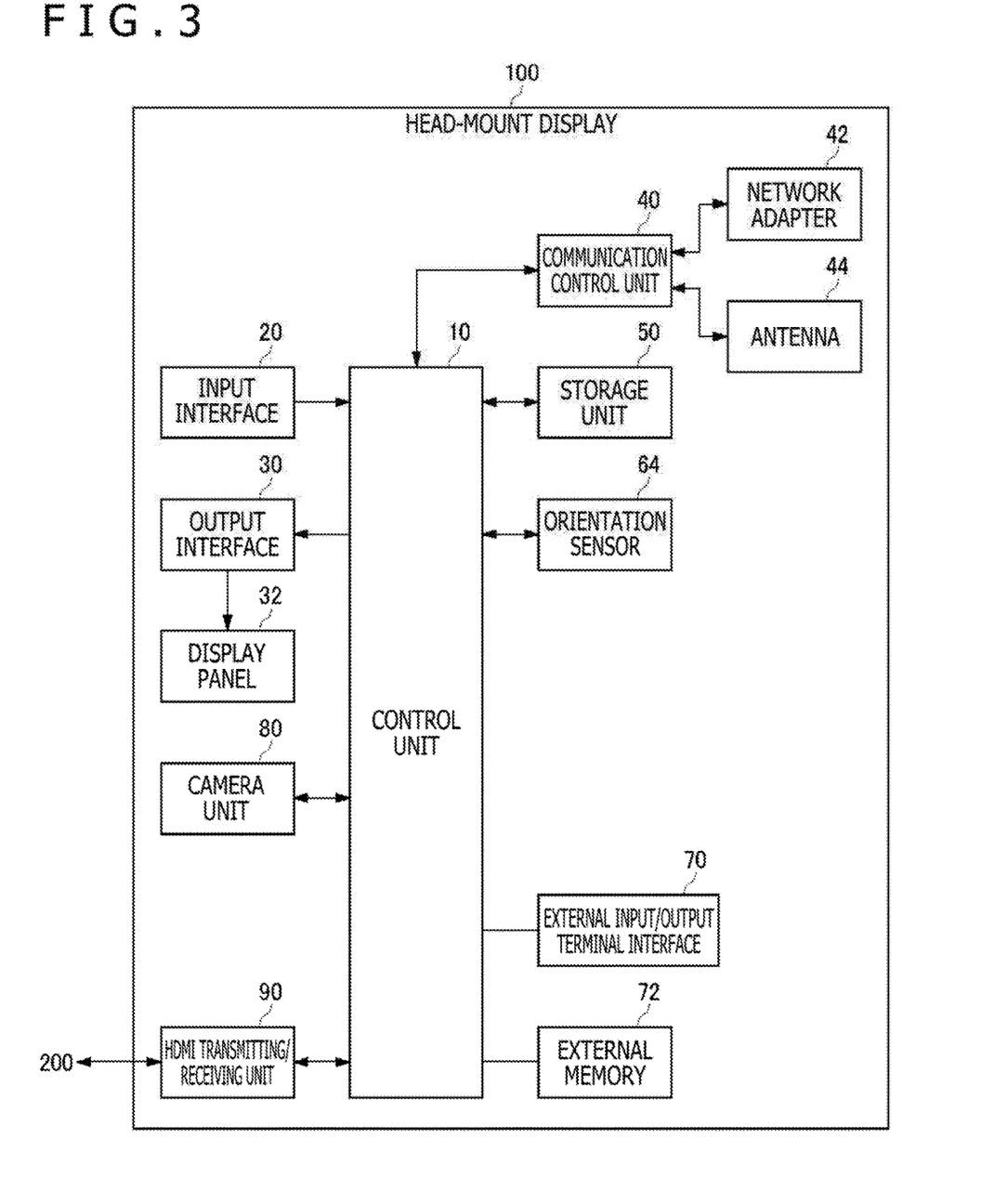
FIG. 3 is a functional configuration diagram of the head-mount display.

FIG. 3 is a functional configuration diagram of the head-mount display 100.

A control unit 10 is a main processor that processes signals such as image signals or sensor signals, instructions, or data, and outputs the processed signals, instructions, or data. An input interface 20 receives manipulation signals or setting signals from a user, and supplies the signals to the control unit 10. An output interface 30 receives a signal for an image from the control unit 10, and displays the image on a display panel 32.

A communication control unit 40 transmits data input from the control unit 10 to an external device via a network adapter 42 or an antenna 44 by a wired or wireless communication. The communication control unit 40 also receives data from an external device and outputs the data to the control unit 10 via the network adapter 42 or the antenna 44 by a wired or wireless communication.

A storage unit 50 temporarily stores data, parameters, manipulation signals and the like processed by the control unit 10.

An orientation sensor 64 detects information regarding the position of the head-mount display 100, and information regarding the orientation of the head-mount display 100 such as the rotation angle or the inclination. The orientation sensor 64 is realized by combining a gyro sensor, an acceleration sensor, an angular-acceleration sensor and the like as appropriate. Forward/backward, leftward/rightward, and upward/downward motions of the user's head may be detected by using a motion sensor formed by combining at least one of a three-axis terrestrial magnetism sensor, a three-axis acceleration sensor, and a three-axis gyro (angular velocity) sensor.

An external input/output terminal interface 70 is an interface for connecting a peripheral instrument such as a USB (Universal Serial Bus) controller. An external memory 72 is an external memory such as a flash memory.

A camera unit 80 includes configurations required for image-capturing such as a lens, an image sensor, or a ranging sensor, and supplies a captured video of the outside world and depth information to the control unit 10. The control unit 10 controls focusing, zooming and the like of the camera unit 80.

An HDMI transmitting/receiving unit 90 transmits and receives digital signals of videos and sounds to and from the image generating apparatus 200 in accordance with HDMI. The HDMI transmitting/receiving unit 90 receives a video of the outside world captured by the camera unit 80 and depth information from the control unit 10, and transmits the video and the depth information to the image generating apparatus 200 through an HDMI transmission path. The HDMI transmitting/receiving unit 90 receives an image generated by the image generating apparatus 200 from the image generating apparatus 200 through the HDMI transmission path, and supplies the image to the control unit 10.

The control unit 10 can supply data of an image or a text to the output interface 30 to cause a display panel 32 to display the image or the text, and supply the data to the communication control unit 40 to make the data transmitted to an external device.

Current position and orientation information regarding the head-mount display 100 detected by the orientation sensor 64 is notified to the image generating apparatus 200 via the communication control unit 40 or the external input/output terminal interface 70. Alternatively, the HDMI transmitting/receiving unit 90 may transmit the current position and orientation information regarding the head-mount display 100 to the image generating apparatus 200.

Figure 4:
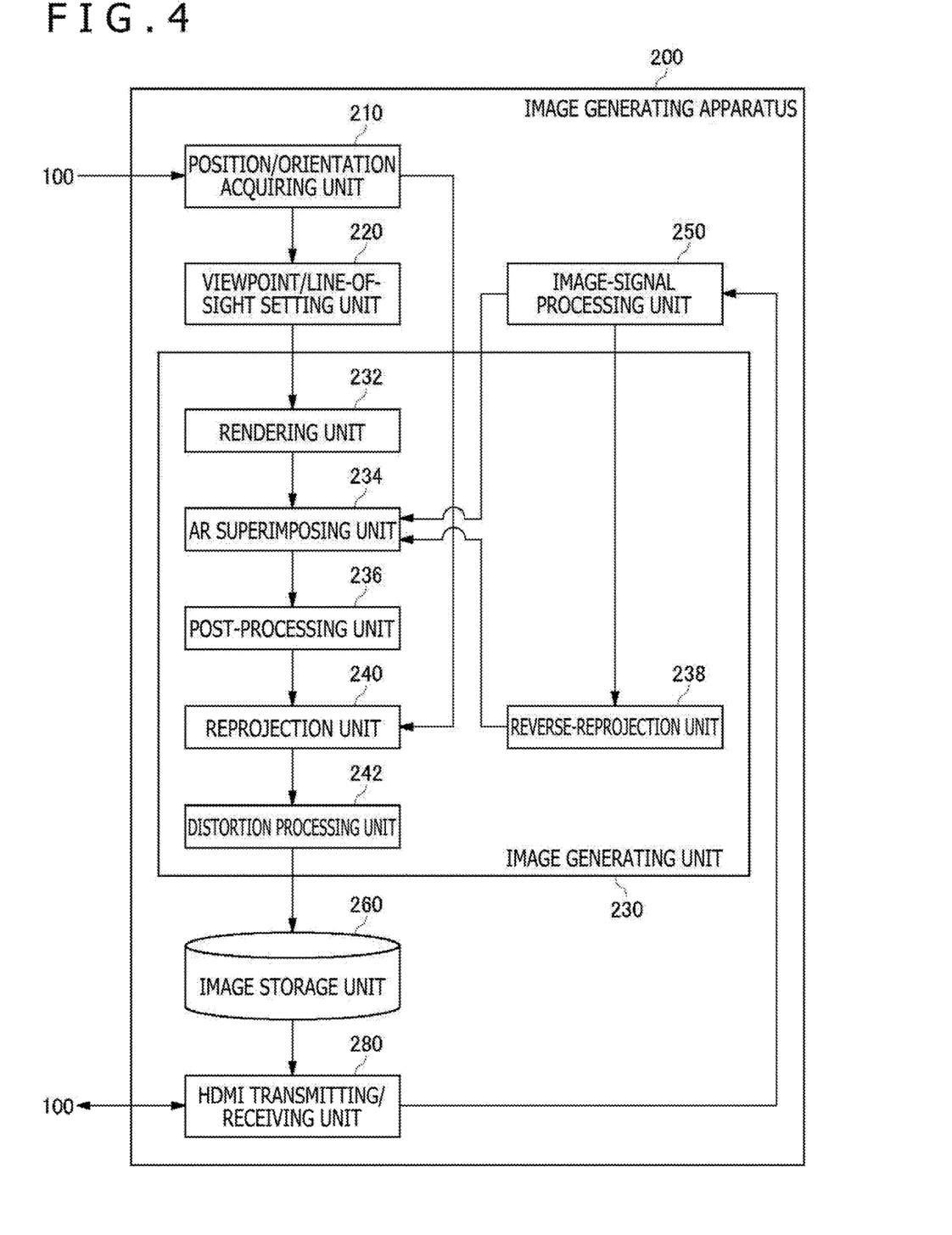
FIG. 4 is a functional configuration diagram of an image generating apparatus according to the present embodiment.

FIG. 4 is a functional configuration diagram of the image generating apparatus 200 according to the present embodiment. A block diagram focusing on functions is drawn in the figure, and functional blocks therein can be realized in various forms only by hardware, only by software, or by a combination of hardware and software.

At least some functions of the image generating apparatus 200 may be implemented by the head-mount display 100. Alternatively, at least some functions of the image generating apparatus 200 may be implemented by a server connected to the image generating apparatus 200 via a network.

A position/orientation acquiring unit 210 acquires current position and orientation information regarding the head-mount display 100 from the head-mount display 100.

A viewpoint/line-of-sight setting unit 220 uses the position and orientation information regarding the head-mount display 100 acquired by the position/orientation acquiring unit 210 to set a viewpoint position and a line-of-sight direction of a user.

An HDMI transmitting/receiving unit 280 receives a video of the reality space captured by the camera unit 80 from the head-mount display 100, and supplies the video to an image-signal processing unit 250.

The image-signal processing unit 250 performs ISP (Image Signal Processing) such as RGB conversion (demosaicing), white-balance, color correction, or noise reduction on a Raw image captured by the camera unit 80 of the head-mount display 100, and furthermore performs distortion correction processing of removing distortion caused by the optical system of the camera unit 80, or the like. The image-signal processing unit 250 supplies, to an image generating unit 230, the RGB image having been subjected to the image signal processing and the distortion correction processing.

The image generating unit 230 reads out data required for generation of computer graphics from an image storage unit 260, renders objects in a virtual space to generate a CG image, superimposes the CG image on a camera image of the reality space provided from the image-signal processing unit 250 to thereby generate an augmented-reality image, and outputs the augmented-reality image to the image storage unit 260.

The image generating unit 230 includes a rendering unit 232, an AR superimposing unit 234, a post-processing unit 236, a reverse-reprojection unit 238, a reprojection unit 240, and a distortion processing unit 242.

The rendering unit 232 renders objects in the virtual space that can be seen from the viewpoint position of a user wearing the head-mount display 100 in the line-of-sight direction of the user in accordance with the viewpoint position and the line-of-sight direction of the user set by the viewpoint/line-of-sight setting unit 220, and gives the rendered objects to the AR superimposing unit 234.

The AR superimposing unit 234 superimposes the CG image generated by the rendering unit 232 on a camera image supplied from the image-signal processing unit 250 to thereby generate an augmented-reality image, and gives the augmented-reality image to the post-processing unit 236.

The post-processing unit 236 performs post-processing such as depth-of-field adjustment, tone mapping, or anti-aliasing on the augmented-reality image, and performs post-processing such that the augmented-reality image in which virtual objects are superimposed on an image of the reality space looks natural and smooth.

The reprojection unit 240 receives latest position and orientation information regarding the head-mount display 100 from the position/orientation acquiring unit 210, performs reprojection processing on the augmented-reality image having been subjected to the post-processing, and converts the augmented-reality image into an image as seen from the latest viewpoint position and in the latest line-of-sight direction of the head-mount display 100.

Here, reprojection is explained. In a case where the head-mount display 100 is given a head-tracking function, and a video of a virtual reality is generated while the viewpoint and the line-of-sight direction are being changed in conjunction with motions of the user's head, a delay occurs between generation and display of the video of the virtual reality. As a result, misalignment occurs between the direction of the user's head used as the premise at the time of generation of the video and the direction of the user's head at a time point of display of the video on the head-mount display 100, and the user may feel as if he/she got sick (called "VR sickness (Virtual Reality Sickness)" and the like).

In this manner, it takes a long time until a drawn image is output to the head-mount display 100 after a motion of the head-mount display 100 is sensed, a CPU issues an image-drawing command, and a GPU (Graphics Processing Unit) executes rendering. It is assumed here that image-drawing is performed at the frame rate of 60 fps (frame/second), for example, and a delay corresponding to one frame occurs after a motion of the head-mount display 100 is sensed and until an image is output. This is approximately 16.67 milliseconds if the frame rate is 60 fps, and is a sufficient time for a human to sense a time lag.

In view of this, a process called "time-warp" or "reprojection" is performed, and a rendered image is corrected in accordance with a latest position and a latest orientation of the head-mount display 100 to thereby make it difficult for a human to sense a time lag.

The distortion processing unit 242 performs a process of distorting (distortion) and deforming an image in accordance with a distortion caused by the optical system of the head-mount display 100 on an augmented-reality image having been subjected to the reprojection processing, and stores the distorted and deformed image in the image storage unit 260.

The HDMI transmitting/receiving unit 280 reads out, from the image storage unit 260, frame data of the augmented-reality image generated by the image generating unit 230, and transmits the frame data to the head-mount display 100 in accordance with HDMI.

In a case where a camera image captured from a viewpoint position and in a line-of-sight direction at a recent time point is superimposed on a CG image rendered on the premise of a viewpoint position and a line-of-sight direction at a past time point, it is necessary to perform reverse-reprojection processing on the camera image in order to make the viewpoint position and the line-of-sight direction match those of the past CG image.

The reverse-reprojection unit 238 performs reverse-reprojection processing of converting a camera image supplied from the image-signal processing unit 250 back into an image as seen from a past viewpoint position and in a past line-of-sight direction, and gives the processed image to the AR superimposing unit 234. The AR superimposing unit 234 superimposes the CG image as seen from the past viewpoint position and in the past line-of-sight direction generated by the rendering unit 232 on the reverse-reprojected camera image to thereby generate an augmented-reality image, and gives the augmented-reality image to the post-processing unit 236.

Figure 5:
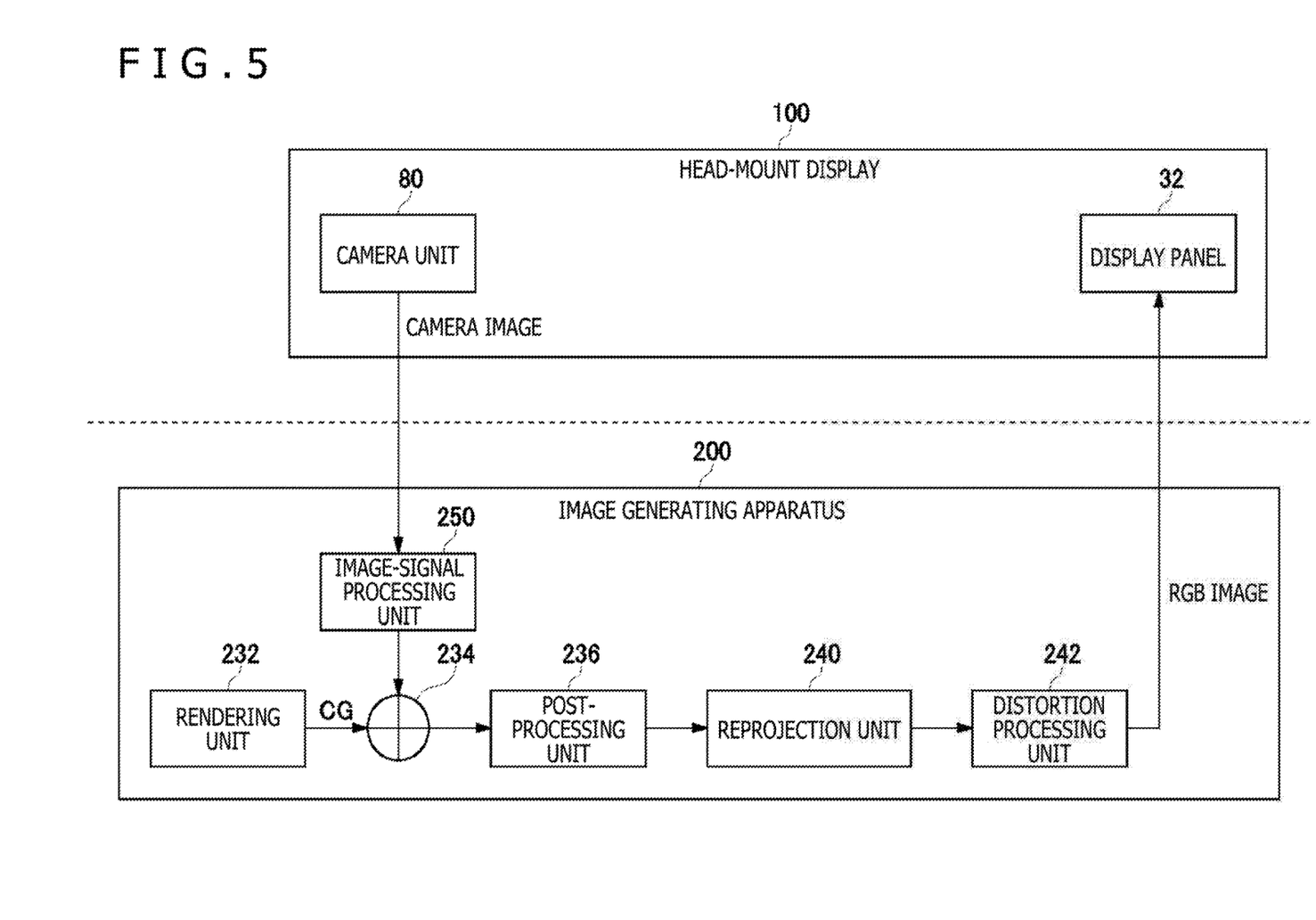
FIG. 5 is a figure for explaining the configuration of the image generating system to serve as the premise for superimposing a CG image on a camera image to generate an augmented-reality image.
Figure 6:
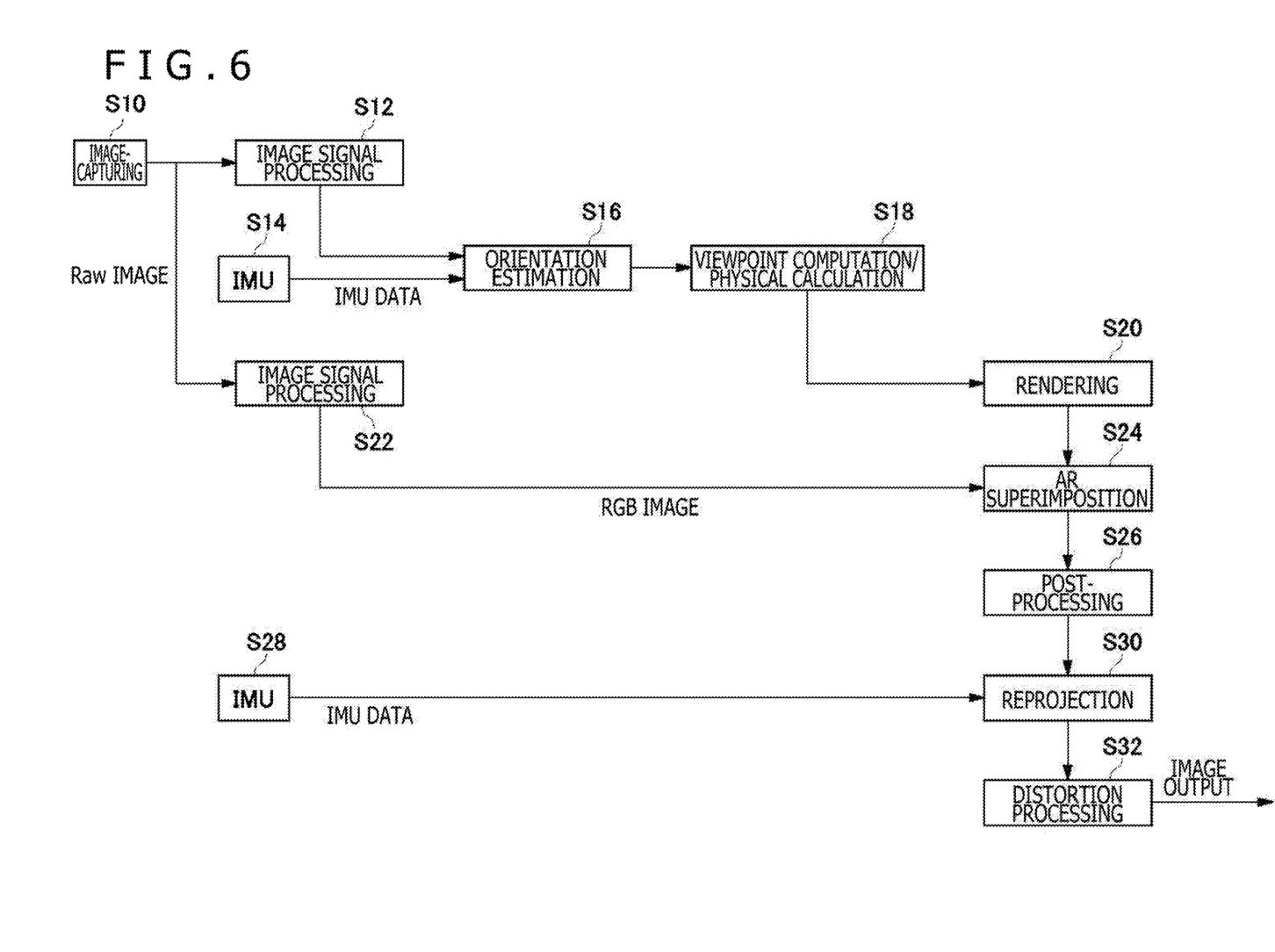
FIG. 6 is a figure for explaining a procedure of generating an augmented-reality image to be performed by the image generating system in FIG. 5.
Figure 7:
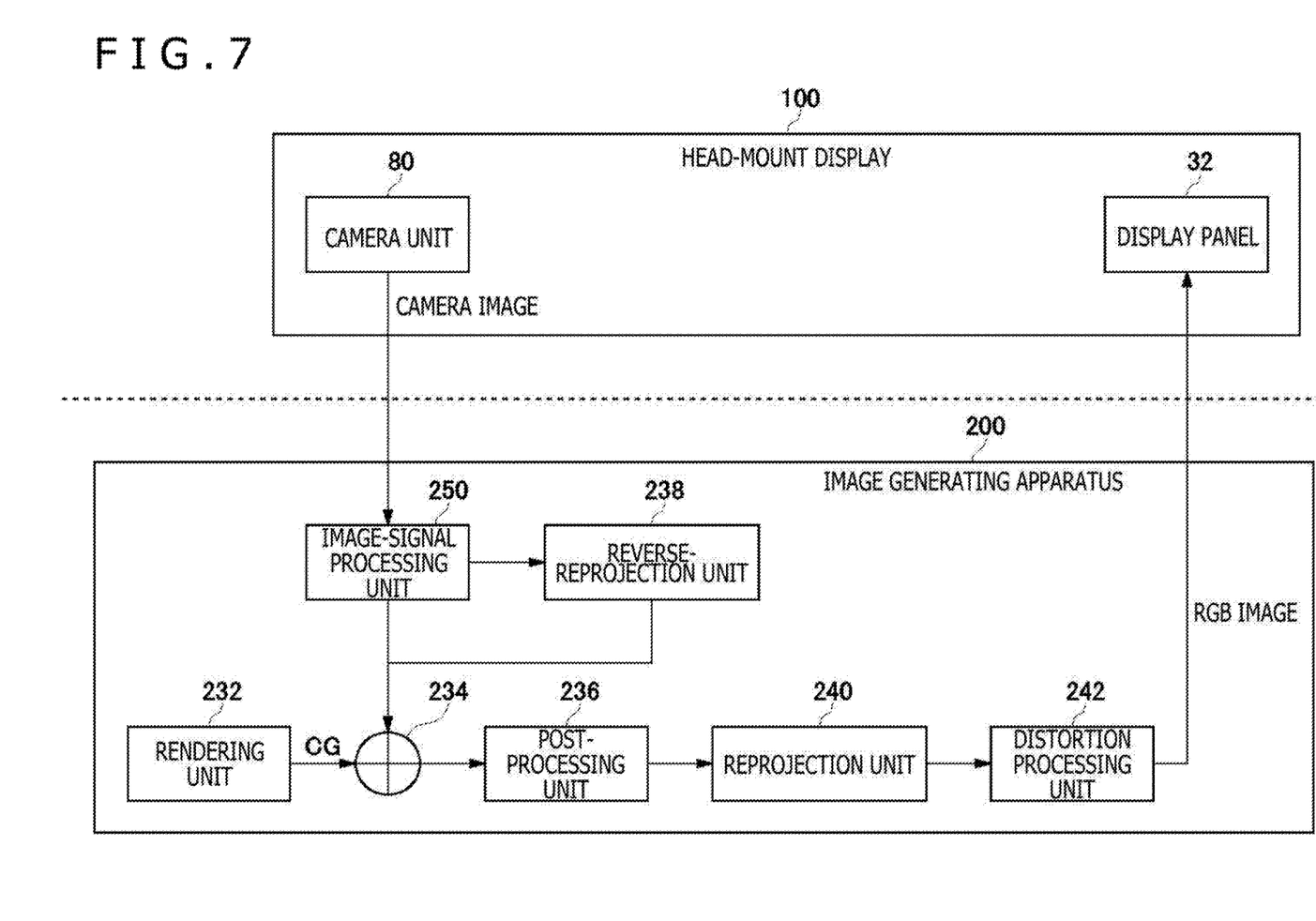
FIG. 7 is a figure for explaining the configuration of the image generating system according to the present embodiment for superimposing a CG image on a camera image to generate an augmented-reality image.
Figure 8:
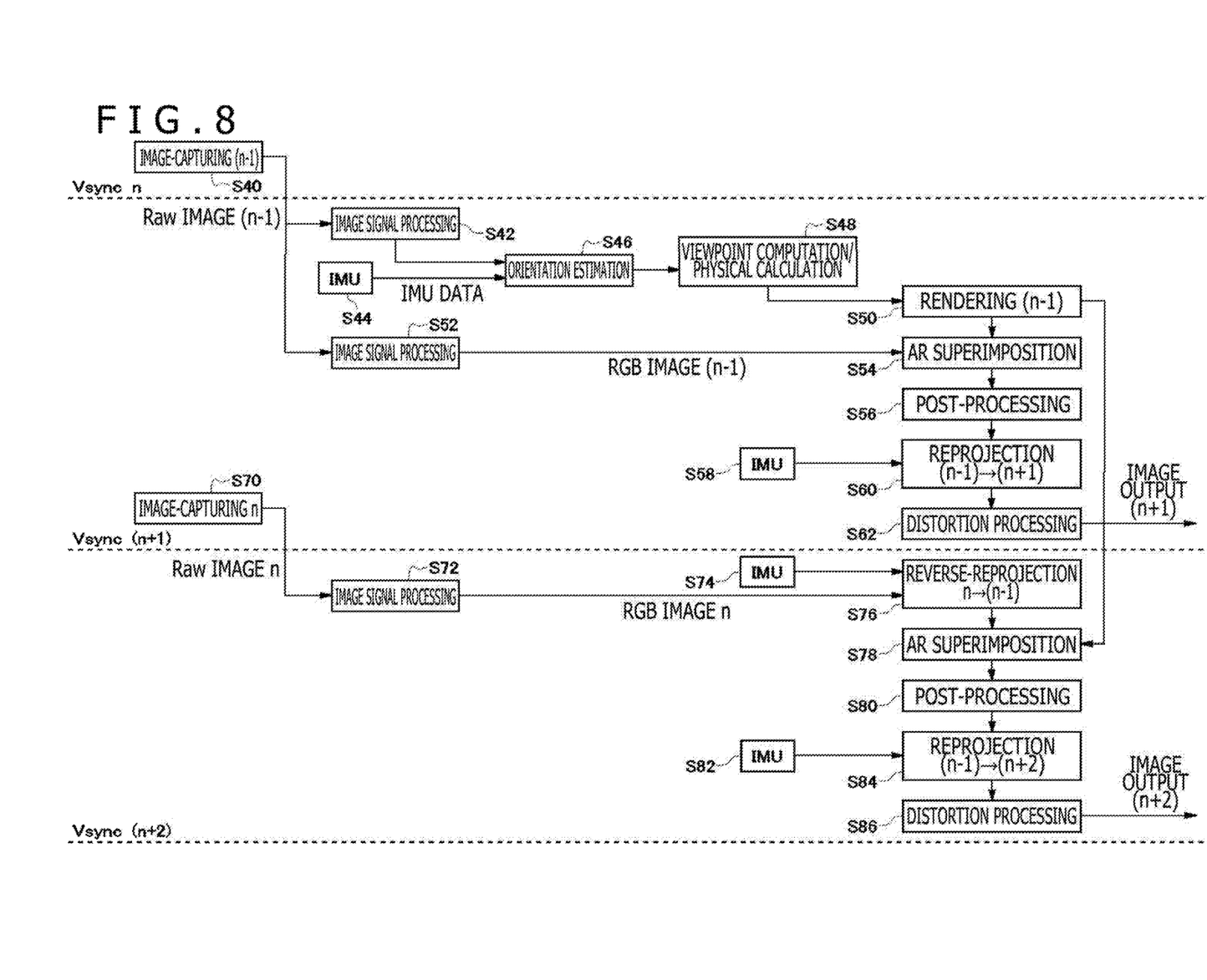
FIG. 8 is a figure for explaining a procedure of generating an augmented-reality image to be performed by the image generating system in FIG. 7.

With reference to FIG. 5 and FIG. 6, a premise technique of the present embodiment is explained, and thereafter with reference to FIG. 7 and FIG. 8, an improved technique of the present embodiment is explained.

FIG. 5 is a figure for explaining the configuration of the image generating system to serve as the premise for superimposing a CG image on a camera image to generate an augmented-reality image. Here, for ease of explanation, main configurations of the head-mount display 100 and the image generating apparatus 200 that are for generating an augmented-reality image are illustrated and explained.

A camera image of the outside world captured by the camera unit 80 of the head-mount display 100 is transmitted to the image generating apparatus 200, and supplied to the image-signal processing unit 250. The image-signal processing unit 250 performs the image signal processing and the distortion correction processing on the camera image, and gives the processed camera image to the AR superimposing unit 234.

The rendering unit 232 of the image generating apparatus 200 generates virtual objects as seen from the viewpoint position and in the line-of-sight direction of a user wearing the head-mount display 100, and gives the virtual objects to the AR superimposing unit 234.

The AR superimposing unit 234 superimposes the CG image on the camera image, and generates an augmented-reality image. The post-processing unit 236 performs the post-processing on the augmented-reality image. The reprojection unit 240 converts the augmented-reality image having been subjected to the post-processing such that the viewpoint and the line-of-sight direction of the augmented-reality image match a latest viewpoint position and a latest line-of-sight direction. The distortion processing unit 242 performs the distortion processing on the augmented-reality image obtained after the reprojection. An eventual RGB image obtained after the distortion processing is transmitted to the head-mount display 100, and displayed on the display panel 32.

FIG. 6 is a figure for explaining a procedure of generating an augmented-reality image to be performed by the image generating system in FIG. 5.

The camera unit 80 of the head-mount display 100 captures an image of the outside world, and outputs a Raw image (S10). The image-signal processing unit 250 performs the image signal processing and the distortion correction processing on the Raw image captured by the camera unit 80, and generates a camera image for use in SLAM (Simultaneous Localization and Mapping) (S12). IMU data indicating current orientation information regarding the head-mount display 100 is acquired from an IMU (Inertial Measurement Unit) such as the orientation sensor 64 of the head-mount display 100 (S14). SLAM processing of simultaneously performing self-localization and environment-mapping is executed by using the camera image and the IMU data, and the orientation of the user wearing the head-mount display 100 is estimated (S16).

Processes required for an update of computer graphics such as viewpoint computation or physical calculation for virtual objects are performed on the basis of orientation estimation data (S18). The rendering unit 232 renders objects in a virtual space, and generates a CG image (S20).

Here, it is noted that since a process amount increases depending on the number of objects to be displayed in the virtual space, rendering takes a considerably long time if the number of objects is large.

The image-signal processing unit 250 performs the image signal processing and the distortion correction processing on the Raw image captured by the camera unit 80, and generates a camera image for providing a see-through video to the head-mount display 100 (S22).

The AR superimposing unit 234 superimposes the CG image on the camera image to thereby generate an augmented-reality image (S24). The post-processing unit 236 performs the post-processing on the augmented-reality image (S26).

It is noted here that since the post-processing is a process on the entire image, it can be performed in a relatively short time as compared with the rendering, without being dependent on the number of virtual objects.

IMU data indicating latest orientation information regarding the head-mount display 100 is acquired from an inertial measurement unit (S28). The reprojection unit 240 converts the augmented-reality image in accordance with the latest orientation information regarding the head-mount display 100 (S30). The distortion processing unit 242 performs lens-distortion processing on the augmented-reality image after the reprojection, and outputs the augmented-reality image having been subjected to the lens-distortion processing (S32).

In a case of the configuration and processing procedure of the image generating system explained with reference to FIG. 5 and FIG. 6, camera images are superimposed on images in accordance with the frame rate of the rendering. Since the rendering takes a long time for processing, the frame rate of the rendering of a virtual space by the rendering unit 232 is lower than the frame rate of image-capturing of the reality space by the camera unit 80. For example, even if image-capturing is performed by the camera unit 80 at 120 fps, images can be drawn by the rendering only at 60 fps in some cases. Accordingly, the frame rate of a see-through video displayed on a display panel of the head-mount display 100 lowers in accordance with the frame rate of the rendering, and the see-through video is interrupted often, resulting in the loss of the sense of reality even if the augmented-reality video is watched.

In view of this, in the present embodiment, camera images are superimposed multiple times on a CG image rendered once, and the post-processing on the augmented-reality video is performed multiple times to thereby generate a smooth video according to the frame rate of the camera unit 80.

FIG. 7 is a figure for explaining the configuration of the image generating system according to the present embodiment for superimposing a CG image on a camera image to generate an augmented-reality image. Explanations that overlap explanations of the premise technique in FIG. 5 are omitted as appropriate, and configurations which are improvements over the premise technique are explained.

In order to superimpose camera images captured by the camera unit 80 multiple times on a CG image which is a result of the rendering performed by the rendering unit 232 once, the reverse-reprojection unit 238 performs reverse-reprojection processing on camera images having been subjected to the image signal processing and the distortion correction processing by the image-signal processing unit 250, converts the camera images into images as seen from a past viewpoint position and in a past line-of-sight direction of the head-mount display 100, and gives the images obtained through the conversion to the AR superimposing unit 234.

The AR superimposing unit 234 synthesizes a camera image supplied from the image-signal processing unit 250 in the first synthesis on a CG image of a result of the rendering performed by the rendering unit 232 once, but synthesizes camera images reverse-reprojected by the reverse-reprojection unit 238 in the second and subsequent synthesis on the same CG image. The post-processing unit 236 performs the post-processing on an augmented-reality image obtained through synthesis by the AR superimposing unit 234 in any case. The subsequent processes are the same as those in the premise technique in FIG. 5. Note that it may be configured such that a camera image reverse-reprojected by the reverse-reprojection unit 238 is synthesized with a rendering result CG image also in the first synthesis, without distinguishing the first process from the second and subsequent synthesis.

FIG. 8 is a figure for explaining a procedure of generating an augmented-reality image to be performed by the image generating system in FIG. 7.

The camera unit 80 of the head-mount display 100 captures an image of the outside world, and outputs an (n−1)-th Raw image (S40).

At an n-th timing of Vsync, processes of the following Steps S42 to S62 are executed.

The image-signal processing unit 250 performs the image signal processing and the distortion correction processing on the (n−1)-th Raw image captured by the camera unit 80, and generates a camera image for use in SLAM (S42). IMU data that indicates current orientation information regarding the head-mount display 100 is acquired from an inertial measurement unit (S44). SLAM processing is executed by using the camera image and the IMU data, and the orientation of the user wearing the head-mount display 100 is estimated (S46).

Processes required for an update of computer graphics such as viewpoint computation or physical calculation for virtual objects are performed on the basis of orientation estimation data (S48). The rendering unit 232 renders objects in a virtual space, and generates an (n−1)-th CG image (S50).

The image-signal processing unit 250 performs the image signal processing and the distortion correction processing on the (n−1)-th Raw image captured by the camera unit 80, and generates an (n−1)-th camera image for providing a see-through video to the head-mount display 100 (S52).

The AR superimposing unit 234 superimposes the (n−1)-th CG image on the (n−1)-th camera image to thereby generate an (n−1)-th augmented-reality image (S54). The post-processing unit 236 performs the post-processing on the (n−1)-th augmented-reality image (S56).

IMU data indicating latest orientation information regarding the head-mount display 100 is acquired from an inertial measurement unit (S58). The reprojection unit 240 predicts a viewpoint position and a line-of-sight direction of a frame which is two frames ahead on the basis of the latest orientation information of the head-mount display 100, and converts the (n−1)-th augmented-reality image into an (n+1)-th augmented-reality image (S60). Since a delay corresponding to two frames occurs due to the rendering, a frame which is two frames ahead is predicted to perform the reprojection.

The distortion processing unit 242 performs the lens-distortion processing on the (n+1)-th augmented-reality image after the reprojection, and outputs the (n+1)-th augmented-reality image having been subjected to the lens-distortion processing at an (n+1)-th timing of Vsync (S62).

Next, at an n-th timing of Vsync, the camera unit 80 of the head-mount display 100 captures an image of the outside world, and outputs an n-th Raw image (S70).

At an (n+1)-th timing of Vsync, processes of the following Steps S72 to S86 are executed.

The image-signal processing unit 250 performs the image signal processing and the distortion correction processing on the n-th Raw image captured by the camera unit 80, and generates an n-th camera image for providing a see-through video to the head-mount display 100 (S72).

IMU data indicating latest orientation information regarding the head-mount display 100 is acquired from an inertial measurement unit (S74). The reverse-reprojection unit 238 converts the n-th camera image into the (n−1)-th camera image as seen from a viewpoint position of a previous frame and in a line-of-sight direction of the previous frame, on the basis of the latest IMU data (S76).

The AR superimposing unit 234 superimposes the (n−1)-th CG image rendered in Step S50 on the reverse-reprojected (n−1)-th camera image to thereby generate an (n−1)-th augmented-reality image (S78). The post-processing unit 236 performs the post-processing on the (n−1)-th augmented-reality image (S80).

IMU data indicating latest orientation information regarding the head-mount display 100 is acquired from an inertial measurement unit (S82). The reprojection unit 240 predicts a viewpoint position and a line-of-sight direction of a frame which is three frames ahead on the basis of the latest orientation information of the head-mount display 100, and converts the (n−1)-th augmented-reality image into an (n+2)-th augmented-reality image (S84). It is noted that since the camera image is converted back into a camera image of a previous frame by the reverse-reprojection processing, the reprojection processing in Step S84 converts the augmented-reality image into an augmented-reality image of a frame which is three frames ahead.

The distortion processing unit 242 performs the lens-distortion processing on the (n+2)-th augmented-reality image after the reprojection, and outputs the (n+2)-th camera image having been subjected to the lens-distortion processing at an (n+2)-th timing of Vsync (S86).

In this manner, the (n−1)-th CG image is generated in the rendering, the (n−1)-th CG image is superimposed on the (n−1)-th camera image and on the n-th camera image, and the post-processing is performed. Since the post-processing is performed at a frequency which is two times higher than the frequency of the rendering and which is equal to the frame rate of the camera, smooth images are generated.

Note that although two camera images are superimposed on the same CG image rendered once and the post-processing is performed on the resultant superimposed image in the explanation given above, a plurality of camera images may be superimposed on a CG image rendered once and the post-processing may be performed multiple times on the resultant superimposed images if the render takes a longer time.

In the explanation given above, the reverse reprojection is not applied to a camera image when a rendering result CG image is superimposed on the first camera image, and the reverse reprojection is applied to second and subsequent camera images when the same CG image is superimposed on the second and subsequent camera images. However, since the rendering takes a long time, preferably a latest camera image is acquired immediately before the post-processing. Accordingly, a difference occurs between the timestamp of a viewpoint of three-dimensional graphics used for the rendering and the timestamp of a camera image on which the three-dimensional graphics are superimposed. In such a case, even when a CG image is superimposed on the first camera image, the reverse reprojection may be applied to the camera image, and then the CG image may be superimposed thereon so that there will not be a difference between the two timestamps.

The reverse reprojection is performed to make the timestamp of a viewpoint of three-dimensional graphics match the timestamp of a camera image used at the time of the post-processing, and IMU data acquired at a time point between the two timestamps is used for computing an orientation difference to be applied in the reverse reprojection.

Note that IMU data is always acquired from an inertial measurement unit, and all the IMU data of intervals required for the reprojection can be used to predict the orientation. The cycle at which the IMU data is acquired is equal to or shorter than 1 millisecond, and is shorter than the interval of Vsync. It is sufficient to perform linear interpolation for IMU data corresponding to time of prediction during intervals in which there is insufficiency of IMU data.

As mentioned above, the image generating apparatus 200 of the present embodiment superimposes a plurality of camera images on a CG image which is a result of the rendering performed once, and performs the post-processing multiple times. Accordingly, the apparent frame rate increases to the frame rate of camera images, and smooth and natural augmented-reality images can be generated.

Although the post-processing is performed on augmented-reality images in which CG images are superimposed on camera images at a frequency higher than the frequency of the rendering to generate smooth augmented-reality images in the embodiment explained above, this method can be applied not only to tracking of a head-mount display, but also to cases where the angle of a virtual camera typically used for rendering changes, and similar effects can be attained in such cases. For example, in a case where virtual objects are rendered and effects are displayed on the near side while a moving image is being reproduced on the background, the apparent quality can be improved by anti-aliasing or noise reduction.

In addition, the post-processing may be performed at a frequency higher than the frequency of the rendering for multi-layer rendering. For example, objects that are located nearby and move a lot are rendered at a high frame rate, objects that are located far away and move less are rendered at a low frame rate, both the objects are synthesized, and the post-processing is performed thereon. The apparent quality can be improved by increasing the frequency of the post-processing.

The present invention has been explained on the basis of the embodiment thus far. It should be understood by those skilled in the art that the embodiment is illustrated as an example, that various variants are possible for combinations of constituent elements and processing processes of the embodiment, and that those variants also fall within the scope of the present invention.

REFERENCE SIGNS LIST

10 Control unit, 20 Input interface, 30 Output interface, 32 Display panel, 40 Communication control unit, 42 Network adapter, 44 Antenna, 50 Storage unit, 64 Orientation sensor, 70 External input/output terminal interface, 72 External memory, 80 Camera unit, 100 Head-mount display, 200 Image generating apparatus, 210 Position/orientation acquiring unit, 220 Viewpoint/line-of-sight setting unit, 230 Image generating unit, 232 Rendering unit, 234 AR superimposing unit, 236 Post-processing unit, 238 Reverse-reprojection unit, 240 Reprojection unit, 242 Distortion processing unit, 250 Image-signal processing unit, 260 Image storage unit, 280 HDMI transmitting/receiving unit, 300 Interface

INDUSTRIAL APPLICABILITY

The present invention can be applied to the field of image generation.

The invention claimed is:

1. An image generating apparatus comprising:
a rendering unit that renders an object in a virtual space to generate a computer graphics image;
a reverse-reprojection unit that reverse-converts a captured image of a reality space such that a viewpoint position or a line-of-sight direction of the captured image matches a viewpoint position or a line-of-sight direction at a time point at which the rendering unit has generated the computer graphics image;
a superimposing unit that superimposes the computer graphics image on the captured image having been subjected to the reverse-conversion by the reverse-reprojection unit, to generate an augmented-reality image; and
a post-processing unit that performs post-processing on the augmented-reality image, wherein
the superimposing unit superimposes, on the same computer graphics image, a plurality of captured images provided at a frame rate higher than a frame rate of the computer graphics image generated by the rendering unit, to generate the augmented-reality image.

2. The image generating apparatus according to claim 1, further comprising: a reprojection unit that converts the augmented-reality image having been subjected to the post-processing, such that a viewpoint position or a line-of-sight direction of the augmented-reality image matches a new viewpoint position or a new line-of-sight direction.

3. The image generating apparatus according to claim 2, wherein the superimposing unit superimposes the computer graphics image on each of a plurality of the captured images after having been subjected to the reverse-conversion by the reverse-reprojection unit, to generate the augmented-reality image.

4. The image generating apparatus according to claim 2, wherein the superimposing unit superimposes the computer graphics image on the first captured image to generate the first augmented-reality image, and superimposes the computer graphics image on the second and subsequent captured images after having been subjected to the reverse-conversion by the reverse-reprojection unit, to generate the second and subsequent augmented-reality images.

5. An image generation method comprising:
rendering an object in a virtual space to generate a computer graphics image;
reverse-converting a captured image of a reality space such that a viewpoint position or a line-of-sight direction of the captured image matches a viewpoint position or a line-of-sight direction at a time point at which the computer graphics image has been generated in the rendering;
superimposing the computer graphics image on the captured image having been subjected to the reverse-conversion in the reverse-reprojection, to generate an augmented-reality image; and
performing post-processing on the augmented-reality image, wherein
in the superimposing, a plurality of captured images provided at a frame rate higher than a frame rate of the computer graphics image generated in the rendering are superimposed on the same computer graphics image to generate the augmented-reality image.

6. A non-transitory, computer readable recording medium containing a computer program, which when executed by a computer, causes the computer to carry out actions, comprising:
rendering an object in a virtual space to generate a computer graphics image;
reverse-converting a captured image of a reality space such that a viewpoint position or a line-of-sight direction of the captured image matches a viewpoint position or a line-of-sight direction at a time point at which the computer graphics image has been generated by the rendering;

superimposing the computer graphics image on the captured image having been subjected to the reverse-conversion by the reverse-reprojection, to generate an augmented-reality image; and
performing post-processing on the augmented-reality image, wherein
by the superimposing, a plurality of captured images provided at a frame rate higher than a frame rate of the computer graphics image generated by the rendering are superimposed on the same computer graphics image to generate the augmented-reality image.

* * * * *